United States Patent
Yanagisawa

(10) Patent No.: US 10,466,428 B2
(45) Date of Patent: Nov. 5, 2019

(54) OPTICAL WAVEGUIDE DEVICE AND LENS COMPONENT

(71) Applicant: Shinko Electric Industries Co., LTD., Nagano-Ken (JP)

(72) Inventor: Kenji Yanagisawa, Nagano (JP)

(73) Assignee: Shinko Electric Industries Co., LTD., Nagano-ken (JP)

( * ) Notice: Subject to any disclaimer, the term of this patent is extended or adjusted under 35 U.S.C. 154(b) by 0 days.

(21) Appl. No.: 16/185,557

(22) Filed: Nov. 9, 2018

(65) Prior Publication Data

US 2019/0187389 A1  Jun. 20, 2019

(30) Foreign Application Priority Data

Dec. 20, 2017  (JP) ................................. 2017-244333

(51) Int. Cl.
G02B 6/42  (2006.01)

(52) U.S. Cl.
CPC .......... *G02B 6/4206* (2013.01); *G02B 6/4274* (2013.01)

(58) Field of Classification Search
CPC ........................... G02B 6/4206; G02B 6/4274
See application file for complete search history.

(56) References Cited

U.S. PATENT DOCUMENTS

| 8,471,154 B1* | 6/2013 | Yoshida | H05K 3/42 |
| | | | 174/260 |
| 9,335,500 B2* | 5/2016 | McLaren | H01L 25/16 |
| 2016/0313519 A1* | 10/2016 | Yanagisawa | G02B 6/4244 |

FOREIGN PATENT DOCUMENTS

| JP | H09-5586 A | 1/1997 |
| JP | 2016-206427 A | 12/2016 |

* cited by examiner

*Primary Examiner* — Ryan A Lepisto
(74) *Attorney, Agent, or Firm* — Wolf, Greenfield & Sacks, P.C.

(57) ABSTRACT

An optical waveguide device includes an optical-electrical hybrid substrate and a lens component mounted on the optical-electrical hybrid substrate. The optical-electrical hybrid substrate includes a wiring substrate and an optical waveguide on the wiring substrate. An optical path changer is arranged on an end of the optical waveguide. The optical waveguide includes an opening configured to expose a connection pad of the wiring substrate. The lens component includes a component body including a conductive member receptacle at a position corresponding to the opening of the optical waveguide. The lens component includes a conductive member partially accommodated in the conductive member receptacle and configured to connect the lens component to the connection pad.

5 Claims, 8 Drawing Sheets

(Comparative Example)

(Comparative Example)

OPTICAL WAVEGUIDE DEVICE AND LENS COMPONENT

CROSS-REFERENCE TO RELATED APPLICATION

This application is based upon and claims the benefit of priority from prior Japanese Patent Application No. 2017-244333, filed on Dec. 20, 2017, the entire contents of which are incorporated herein by reference.

FIELD

This disclosure relates to an optical waveguide device and a lens component.

BACKGROUND

A typical wiring substrate that processes electrical signals may incorporate an optical waveguide formed on the wiring substrate to process optical signals. A lens component mounts on the wiring substrate incorporating the optical waveguide to collect light transmitted through the optical waveguide and allow the light to enter an optical fiber (refer to Japanese Laid-Open Patent Publication Nos. 2016-206427 and 9-5586).

SUMMARY

The lens component may be attached to an optical fiber connector. When the optical fiber connector is attached or removed and a large stress is applied between the lens component and the wiring substrate incorporating the optical waveguide, the lens component may be separated from the wiring substrate. Thus, the fixing strength of the lens component to the wiring substrate incorporating the optical waveguide needs to be increased.

One embodiment is an optical waveguide device. The optical waveguide device includes an optical-electrical hybrid substrate including a wiring substrate and an optical waveguide arranged on the wiring substrate, an optical path changer arranged on an end of the optical waveguide, and a lens component mounted on the optical-electrical hybrid substrate. The optical waveguide includes an opening configured to expose a connection pad of the wiring substrate. The lens component includes a component body including a conductive member receptacle at a position corresponding to the opening of the optical waveguide and a conductive member partially accommodated in the conductive member receptacle and configured to connect the component body to the connection pad.

Another embodiment is a lens component. The lens component includes a component body configured to be mounted on an optical-electrical hybrid substrate. The component body includes a lens portion and a conductive member receptacle extending between an upper surface of the component body and a lower surface of the component body. The lens component further includes a conductive ball accommodated in the conductive member receptacle. The conductive ball accommodated in the conductive member receptacle partially projects from the lower surface of the component body.

Other embodiments and advantages thereof will become apparent from the following description, taken in conjunction with the accompanying drawings, illustrating by way of example the principles of the invention.

It is to be understood that both the foregoing general description and the following detailed description are exemplary and explanatory and are not restrictive of the invention, as claimed.

BRIEF DESCRIPTION OF THE DRAWINGS

The embodiments, together with objects and advantages thereof, may best be understood by reference to the following description of the presently preferred embodiments together with the accompanying drawings in which.

DESCRIPTION OF THE EMBODIMENTS

One embodiment will now be described below. In the accompanying drawings, elements may be enlarged to facilitate understanding. The elements may not be drawn to the actual scale. The scale of an element may differ between drawings. In the cross-sectional views, hatching of some elements may be omitted to facilitate understanding.

Figure 1:
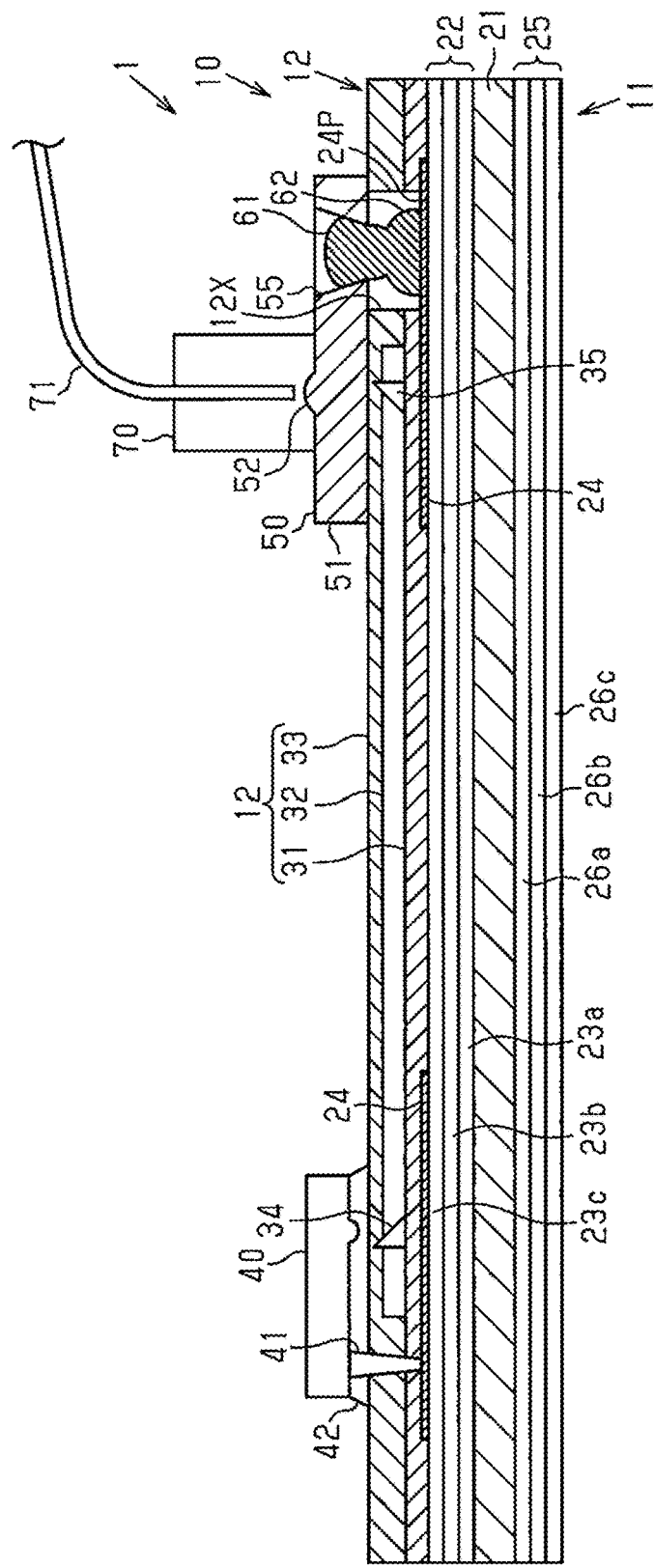
FIG. 1 is a schematic cross-sectional view of an optical waveguide device.

As illustrated in FIG. 1, an optical waveguide device 1 includes an optical-electrical hybrid substrate 10 and a lens component 50 mounted on the optical-electrical hybrid substrate 10. The optical waveguide device 1 may include an opto-electro component 40 mounted on the optical-electrical hybrid substrate 10. The optical-electrical hybrid substrate 10 includes a wiring substrate 11 and an optical waveguide 12 arranged on the wiring substrate 11.

The wiring substrate 11 includes a substrate body 21. The substrate body 21 may be, for example, a core substrate or a build-up core substrate including a core substrate. Alternatively, the substrate body 21 may be a coreless substrate, which does not include a core substrate.

The wiring substrate 11 includes a wiring portion 22 arranged at an upper surface side of the substrate body 21 and a wiring portion 25 arranged at a lower surface side of the substrate body 21.

Although FIG. 1 does not illustrate the structure of the wiring portion 22 in detail, the wiring portion 22 includes wiring layers and insulation layers. For example, an insulation layer 23a is formed on the upper surface of the substrate body 21 to cover a wiring layer (not illustrated) formed on the upper surface of the substrate body 21. An insulation layer 23b is formed on the upper surface of the insulation layer 23a to cover a wiring layer (not illustrated) formed on the upper surface of the insulation layer 23a. An insulation layer 23c is formed on the upper surface of the insulation layer 23b to cover a wiring layer (not illustrated) formed on the upper surface of the insulation layer 23b. A wiring layer 24 is formed on the upper surface of the insulation layer 23c. For example, copper (Cu) may be used as the material of a wiring layer such as the wiring layer 24. For example, an epoxy or polyimide insulation resin may be used as the material of the insulation layers 23a to 23c.

Although FIG. 1 does not illustrate the structure of the wiring portion 25 in detail, the wiring portion 25 includes wiring layers and insulation layers. For example, an insulation layer 26a is formed on the lower surface of the substrate body 21 to cover a wiring layer (not illustrated) formed on the lower surface of the substrate body 21. An insulation layer 26b is formed on the lower surface of the insulation layer 26a to cover a wiring layer (not illustrated) formed on the lower surface of the insulation layer 26a. An insulation layer 26c is formed on the lower surface of the insulation layer 26b to cover a wiring layer (not illustrated) formed on the lower surface of the insulation layer 26b. For example, copper (Cu) may be used as the material of the wiring layers. For example, an epoxy or polyimide insulation resin may be used as the material of the insulation layers 26a to 26c. The thickness of the wiring substrate 11 may be in a range of, for example, 0.8 mm to 1.5 mm. The thickness of the wiring substrate 11 may be, for example, 1.0 mm.

The optical waveguide 12 is arranged on the upper surface of the wiring substrate 11. In a non-restrictive example, the optical waveguide 12 includes a clad layer 31, a core 32, a clad layer 33, and optical path changing mirrors 34 and 35. Each of the optical path changing mirrors 34 and 35 is one example of an optical path changer.

The clad layer 31 covers the wiring layer 24 formed on the wiring substrate 11 (in the example illustrated in FIG. 1, upper surface of insulation layer 23c). The core 32 is formed on the upper surface of the clad layer 31 to transmit an optical signal.

Figure 2:
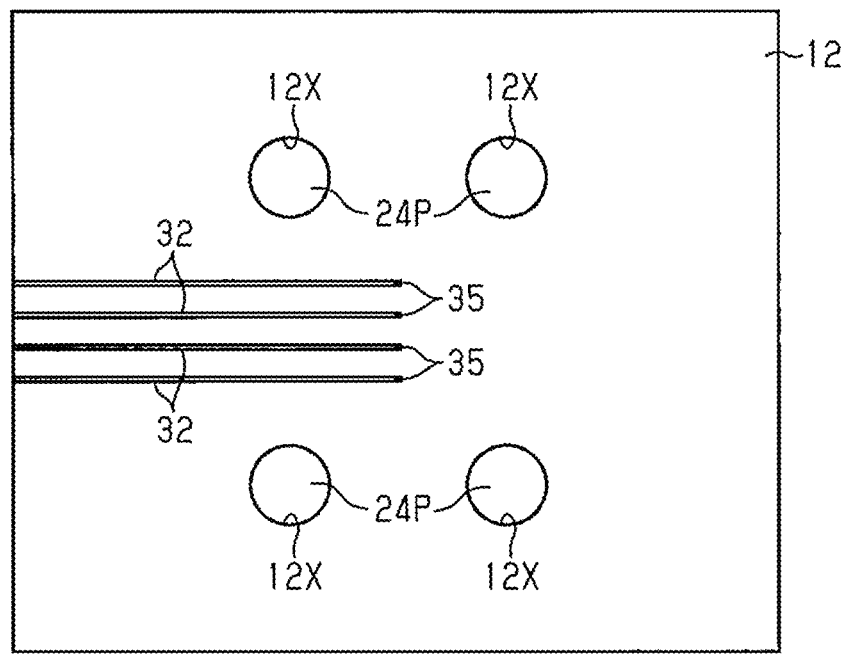
FIG. 2 is a plan view illustrating a portion of an optical-electrical hybrid substrate.

As illustrated in FIG. 2, the optical waveguide 12 may include a plurality of (for example, four) cores 32. The cores 32 are arranged parallel to each other. As illustrated in FIG. 1, the optical path changing mirrors 34 and 35 are located at opposite ends of the optical waveguide 12 (each core 32). The clad layer 33 is formed to cover the upper surface of the clad layer 31 and the cores 32.

The same material may basically be used as the material of the clad layers 31 and 33 and the cores 32. For example, the material of the clad layers 31 and 33 and the cores 32 may be a resin material having transmittance in a wavelength band of light transmitted through the cores 32. For example, an acrylic resin such as polymethyl methacrylate (PMMA), an epoxy resin, or a silicone resin may be used as the material of the clad layers 31 and 33 and the cores 32. A material having a higher refractive index may be selected as the material of the cores 32 than the material of the clad layers 31 and 33, which cover the cores 32, so that optical signals are transmitted in only the core 32. The difference in refractive index between the cores 32 and the clad layers 31 and 33 is not particularly limited. However, the difference is preferably, for example, approximately 0.3% to 5.5%, and more preferably, approximately 0.8% to 2.2%. The thickness of the optical waveguide 12 may be in a range of, for example, 30 µm to 150 µm. The thickness of the optical waveguide 12 may be, for example, 70 µm.

As illustrated in FIG. 1, the optical path changing mirror 34 is located on a first end of the core 32 (left end in FIG. 1). The opto-electro component 40 is mounted on the optical-electrical hybrid substrate 10 at a position corresponding to the optical path changing mirror 34.

The opto-electro component 40 may include one or more optical elements. The opto-electro component 40 includes, for example, a light emitting element that converts an electrical signal into an optical signal. The light emitting element is, for example, a vertical cavity surface emitting laser (VCSEL) or a light emitting diode (LED). The opto-electro component 40 may further include a light receiving element that converts an optical signal into an electrical signal. The light receiving element is, for example, a photodiode (PD) or an avalanche photodiode (APD). The opto-electro component 40 may include both the light emitting element and the light receiving element.

The opto-electro component 40 is connected to the wiring layer 24 by an electrode terminal 41 extending through the clad layers 31 and 33. The electrode terminal 41 may be, for example, a gold bump or a solder bump. The material of the solder bump may be, for example, an alloy containing lead (Pb), an alloy of tin (Sn) and copper, an alloy of tin and silver (Ag), or an alloy of tin, silver, and copper.

The gap between the clad layer 33 and the opto-electro component 40 is filled with an underfill resin 42. The underfill resin 42 increases the connection strength of the opto-electro component 40 to the optical-electrical hybrid substrate 10 (optical waveguide 12). The material of the underfill resin 42 may be, for example, an epoxy insulative resin.

The optical path changing mirror 35 is arranged on a second end of the core 32 (right end in FIG. 1). The lens component 50 is mounted on the optical-electrical hybrid substrate 10 at a position corresponding to the optical path changing mirror 35. The lens component 50 includes a component body 51 and solder portions 61 and 62. The solder portions 61 and 62 are one example of a conductive member. The solder portions 61 and 62 fix the component body 51 to the optical-electrical hybrid substrate 10. The component body 51 includes lens portions 52. The component body 51 is arranged so that each lens portion 52 is located directly above the corresponding one of the optical path changing mirrors 35.

The optical waveguide 12 includes openings 12X exposing portions of the wiring layer 24 as connection pads 24P. The openings 12X extend through the clad layers 31 and 33. As illustrated in FIG. 2, the optical waveguide 12 includes, for example, four openings 12X, and the connection pads 24P are exposed in the respective openings 12X. The openings 12X are arranged at an outer side of the cores 32 and surround the optical path changing mirrors 35.

The component body 51 further includes solder ball receptacles 55. Each of the solder ball receptacles 55 is one example of a conductive member receptacle. The solder portions 61 are accommodated in a lower part of the solder ball receptacles 55. The solder portions 61 are integral with the solder portions 62 accommodated in the openings 12X of the optical waveguide 12. The solder portions 61 and 62 connect the component body 51 (lens component 50) to the connection pads 24P of the wiring layer 24. The solder portions 61 and 62 are formed from each of solder balls 65 provided to the lens component 50. Each of the solder balls 65 is one example of a conductive ball. Thus, the lens component 50 includes the component body 51 and the solder balls 65 accommodated in the solder ball receptacles 55 of the component body 51, and the lens component 50 is fixed to the optical-electrical hybrid substrate 10 by the solder portions 61 and 62 formed from each of the solder balls 65.

An optical fiber connector 70 may be attached to the component body 51. The optical fiber connector 70 positions an optical fiber 71 directly above the region of the component body 51 where the lens portions 52 are arranged.

In the optical waveguide device 1, light emitted from the opto-electro component 40 is reflected by the optical path changing mirrors 34, transmitted thought the cores 32, and reflected by the optical path changing mirrors 35. The light enters the component body 51. The lens portions 52 of the component body 51 collect light emitted from the optical waveguide 12. The collected light enters the optical fiber 71.

The lens component 50 will now be described.

As illustrated in FIGS. 4A to 5C, the component body 51 of the lens component 50 is rectangular box-shaped. The dimensions of the component body 51 may be such that, for example, longitudinal dimension (length)×lateral dimension (width)×height is 3.6 mm×2.9 mm×1.0 mm. The diameter of each solder ball 65 is, for example, 0.8 mm.

The component body 51, for example, has an upper surface 51a and a lower surface 51b and includes rectangular recesses 53a and 53b in the center of each of the upper surface 51a and the lower surface 51b. The lens portions 52 (four in the present example) are located in the recesses 53a and 53b. The lens portions 52 are arranged in a row. Each lens portion 52 has two semispherical ends projecting in the recesses 53a and 53b. The arrangement pitch of the lens portions 52 is, for example, 0.25 mm.

Figure 4A:
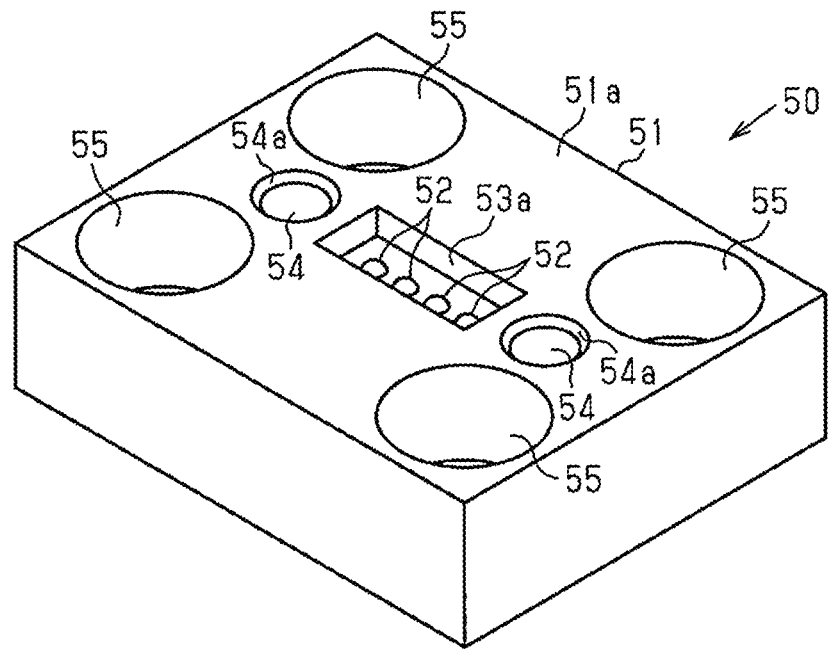
FIG. 4A is a perspective view of the lens component taken from an upper side.
Figure 4B:
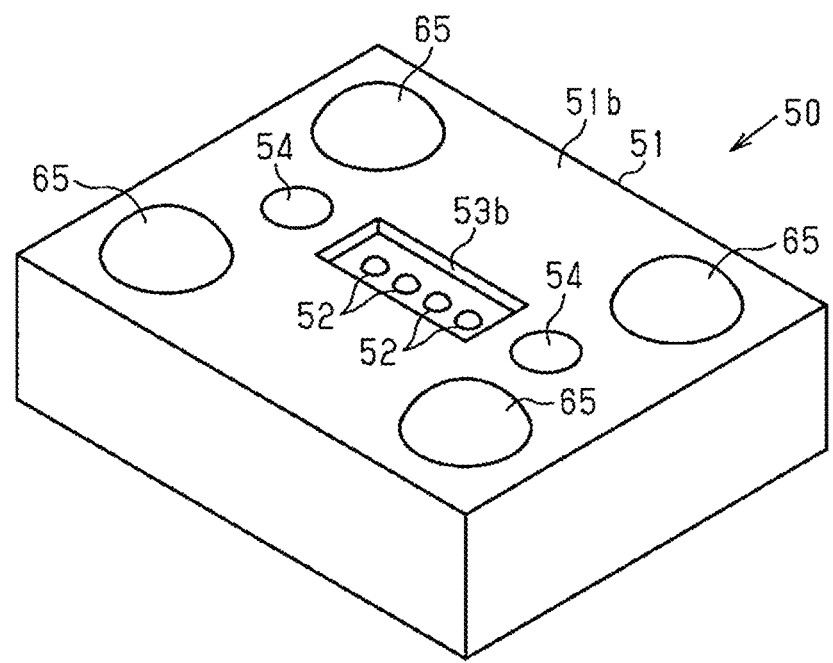
FIG. 4B is a perspective view of the lens component taken from a lower side.

In the example illustrated in FIGS. 4A and 4B, the two ends of each lens portion 52 are semispherical but do not necessarily have to be semispherical. The two ends of each lens portion 52 (i.e., end exposed in the upper surface 51a of the component body 51 and end exposed in the lower surface 51b of the component body 51) may be planar. In this case, the recesses 53a and 53b may be omitted.

Figure 6:
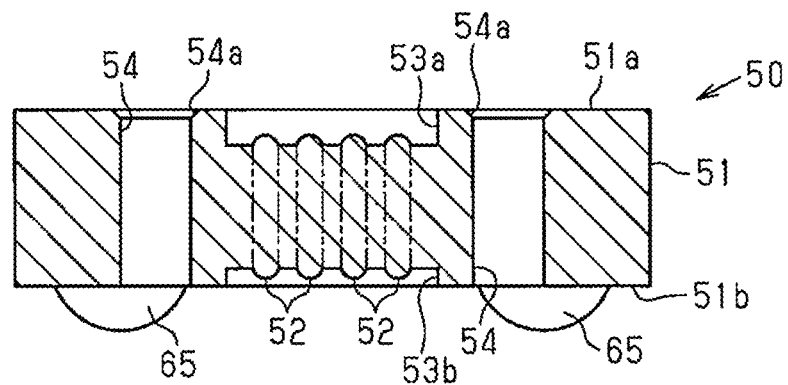
FIG. 6 is a cross-sectional view taken along line 6-6 in FIG. 5A.

The material of the component body 51 may be a resin or glass having transmittance in a wavelength band of light emitted from the opto-electro component 40 illustrated in FIG. 1. For example, the component body 51 includes the lens portions 52 and is formed integrally with the lens portions 52 in a mold or the like. As illustrated in FIG. 6, each lens portion 52 includes semispherical parts indicated by solid lines and a part indicated by broken lines.

The component body 51 includes connector attachment holes 54 (for example, two). Each of the connector attachment holes 54 is one example of an attachment hole for the optical fiber connector 70. For example, the two connector attachment holes 54 are aligned with the lens portions 52, and the lens portions 52 are located between the connector attachment holes 54. The connector attachment holes 54 are arranged in accordance with the position where the optical fiber connector 70 is attached to the component body 51. As illustrated in FIG. 6, the connector attachment holes 54 are open in the upper surface 51a and the lower surface 51b of the component body 51. The open edges of the connector attachment holes 54 in the upper surface 51a are chamfered. As a result, each connector attachment hole 54 is defined by a tapered surface 54a, the diameter of which gradually decreases downward from the upper surface 51a.

In the present example, the component body 51 includes four solder ball receptacles 55. The solder ball receptacles 55 are arranged at corners of the box-shaped component body 51. The solder ball receptacles 55 extend through the component body 51 between the upper surface 51a and the lower surface 51b. The solder balls 65 are respectively accommodated in the solder ball receptacles 55.

Figure 5A:
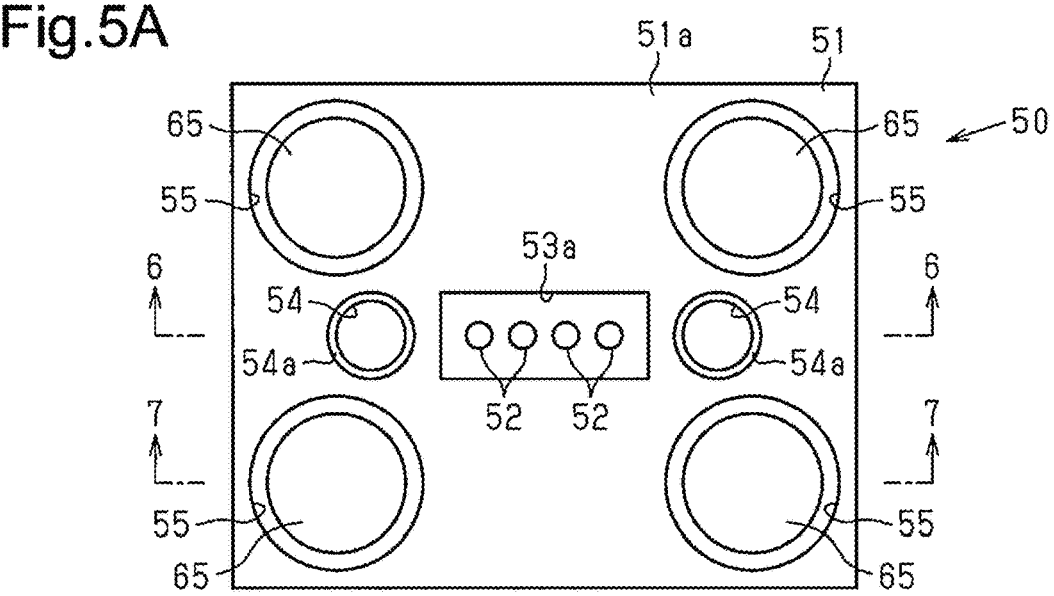
FIG. 5A is an upper view of the lens component.
Figure 5B:
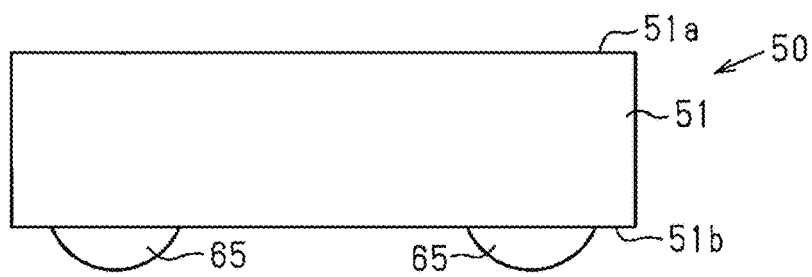
FIG. 5B is a side view of the lens component.
Figure 5C:
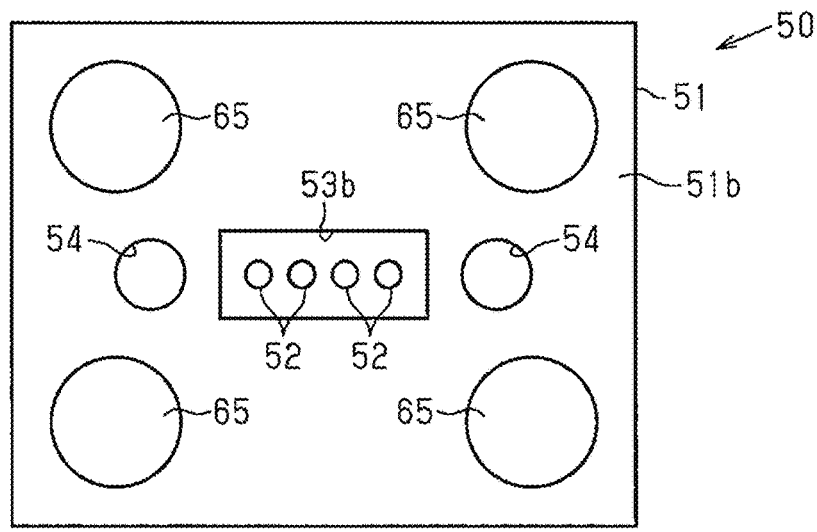
FIG. 5C is a lower view of the lens component.
Figure 7:
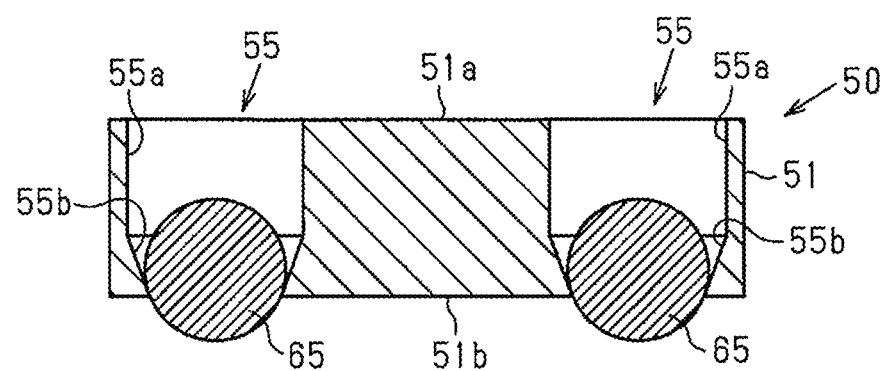
FIG. 7 is a cross-sectional view taken along line 7-7 in FIG. 5A.

Each solder ball receptacle 55 includes an upper opening that is open in the upper surface 51a of the component body 51 and a lower opening that is open in the lower surface 51b of the component body 51. The lower opening is set to have a smaller dimension (for example, diameter) than the upper opening. The dimension (diameter) of the upper opening of the solder ball receptacle 55 is set to be larger than the dimension (diameter) of the solder balls 65. The dimension (diameter) of the lower opening of the solder ball receptacle 55 is set to be smaller than the dimension (diameter) of the solder balls 65. For example, the diameter of the upper opening of each solder ball receptacle 55 may be 1.0 mm, and the diameter of the lower opening of the solder ball receptacle 55 may be 0.7 mm. In this case, the solder balls 65 having, for example, a diameter of 0.8 mm may be used. Since the diameter of the lower opening of the solder ball receptacles 55 is smaller than the diameter of the solder balls 65, the solder balls 65 project from the lower surface 51b of the component body 51 as illustrated in FIGS. 5B and 7. The projection amount of the solder balls 65 may be, for example, 0.25 mm.

The material of the solder balls 65 may be, for example, an alloy containing lead (Pb), an alloy of tin (Sn) and copper, an alloy of tin and silver (Ag), or an alloy of tin, silver, and copper. Highly viscous flux jelly is applied to the surface of the solder balls 65, the flux jelly holds the solder balls 65 in the solder ball receptacles 55.

As illustrated in FIG. 7, in the present example, each solder ball receptacle 55 includes a tubular portion 55a and a tapered portion 55b. The tubular portion 55a extends from the upper surface 51a of the component body 51 toward the lower surface 51b and has a fixed diameter in the extension direction. The tapered portion 55b extends from the lower end of the tubular portion 55a to the lower surface 51b of the component body 51 and has a diameter that gradually decreases. In other words, the tapered portion 55b may be considered as an enlarged diameter portion partially extending from the lower opening of the solder ball receptacle 55 (i.e., lower surface 51b of component body 51) toward the upper opening (i.e., upper surface 51a) and having a diameter that gradually increases from the lower opening. The solder balls 65 adhere to wall surfaces of the tapered portions 55b with the flux jelly described above.

Figure 3:
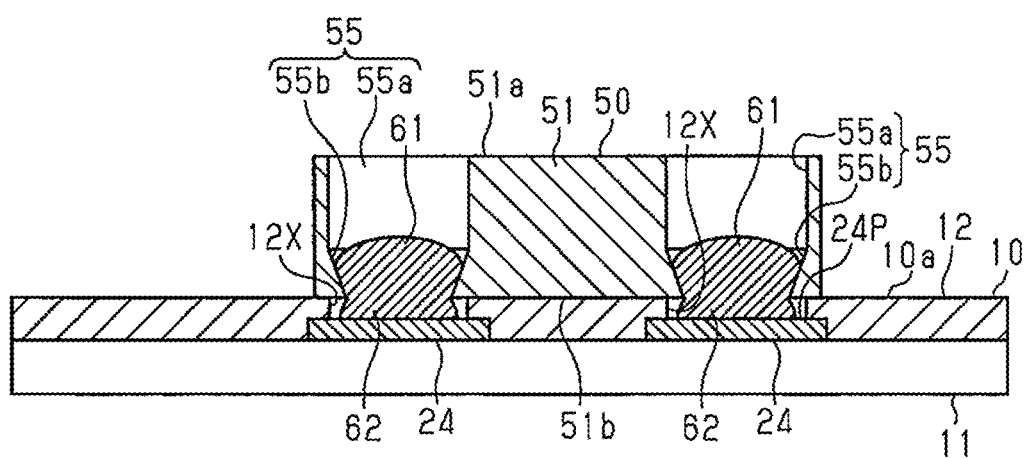
FIG. 3 is a schematic cross-sectional view illustrating a lens component mounted on the optical-electrical hybrid substrate.

The solder balls 65 are heated and melted by a mounting jig 80, which will be described later. As illustrated in FIG. 3, the molten solder flows from the solder ball receptacles 55 of the component body 51 into the openings 12X of the optical waveguide 12 and connects with the connection pads 24P exposed in the openings 12X. Portions of the molten solder adhering to the wall surfaces of the tapered portions 55b of the solder ball receptacles 55 harden to serve as the solder portions 61. As a result, each solder portion 61 is shaped so that the diameter gradually increases from the lower surface 51b toward the upper surface 51a of the component body 51 along the wall surface of the tapered portion 55b. Portions of the molten solder flowing into the openings 12X and connected to the connection pads 24P harden to serve as the solder portions 62. As a result, the solder portions 61 and 62 fix the component body 51 to the upper surface (connection pads 24P) of the optical-electrical hybrid substrate 10.

The mounting of the lens component 50 will now be described.

Figure 8A:
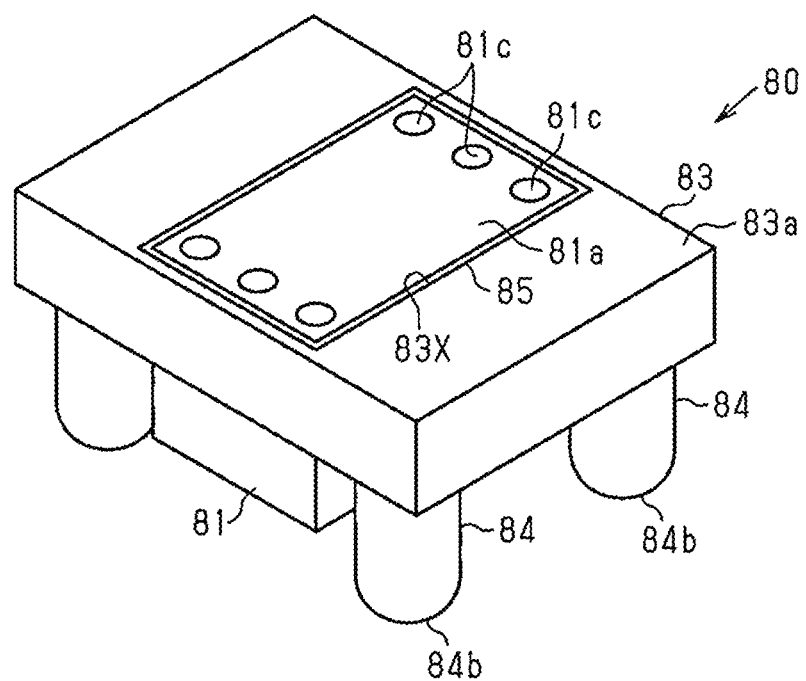
FIG. 8A is a perspective view of a mounting jig taken from an upper side.
Figure 8B:
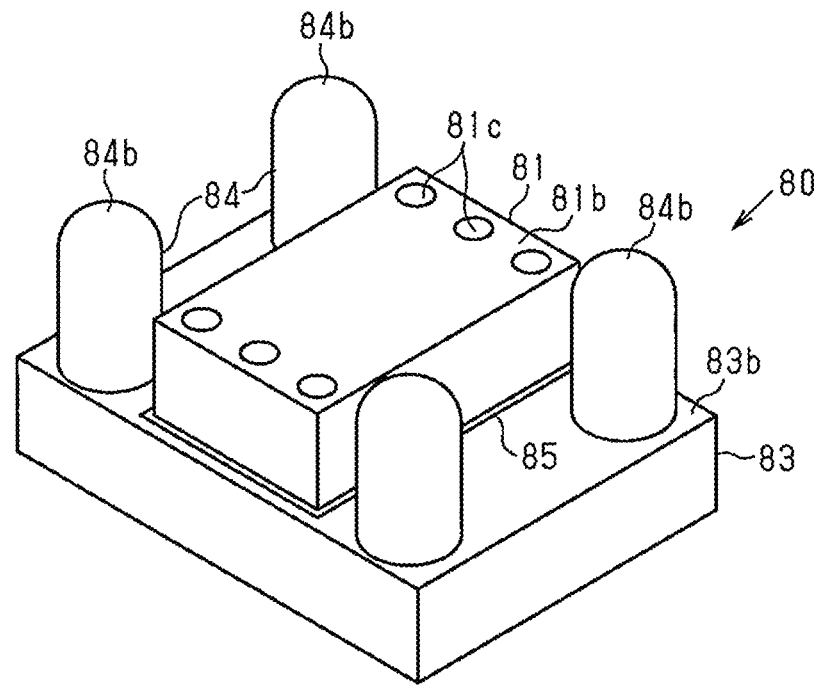
FIG. 8B is a perspective view of the mounting jig taken from a lower side.

FIGS. 8A and 8B illustrate the mounting jig 80 used to mount the lens component 50. The mounting jig 80 is attached to a typical chip mounter device used to flip-chip-connect a semiconductor chip.

The mounting jig 80 includes a suction head 81, a heating base 83, and heating probes 84.

The suction head 81 is rectangular box-shaped and includes a plurality of (six in FIGS. 8A and 8B) suction holes 81c. The suction holes 81c extend through the suction head 81 between an upper surface 81a and a lower surface 81b of the suction head 81. The suction holes 81c are connected to, for example, a vacuum pump (not illustrated). The suction head 81 holds the lens component 50 through vacuum suction. The material of the suction head 81 may be a heat insulating material such as ceramic.

The heating base 83 is rectangular plate-shaped. At a center of the heating base 83, a rectangular through hole 83X extends through the heating base 83 between an upper surface 83a and a lower surface 83b of the heating base 83. The suction head 81 is inserted into the through hole 83X. The suction head 81 is fixed to the heating base 83, for example, by an adhesive 85.

The heating probes 84 are formed on the lower surface 83b of the heating base 83. The heating probes 84 are located at positions corresponding to the solder ball receptacles 55 of the component body 51. Each heating probe 84 is cylindrical and has a semispherical lower end. The heating probe 84 has a dimension (diameter) allowing for insertion of the heating probe 84 into the solder ball receptacle 55 of the component body 51. The diameter of the heating probe 84 may be, for example, 0.6 mm.

The heating probe 84 has a length allowing for insertion of the heating probe 84 into the solder ball receptacle 55 of the component body 51 with the lens component 50 held by the suction head 81. Additionally, the length of the heating probe 84 is set to allow the heating probe 84 to contact the solder ball 65 accommodated in the solder ball receptacle 55 of the component body 51 when the lens component 50 is mounted.

The process for mounting the lens component 50 on the optical-electrical hybrid substrate 10 will now be described.

Figure 9A:
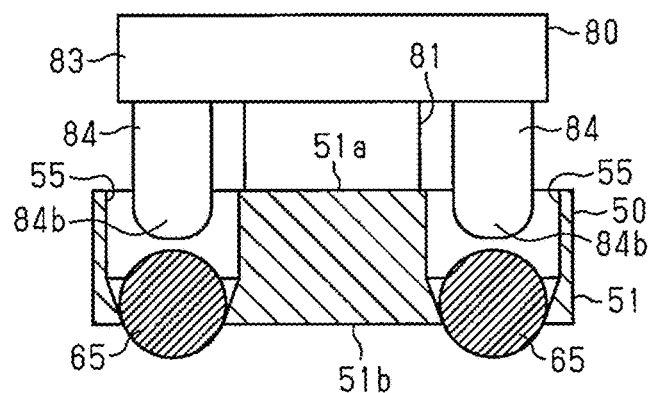
FIGS. 9A to 9C are schematic cross-sectional views illustrating the process for mounting the lens component using the mounting jig.

As illustrated in FIG. 9A, the suction head 81 is actuated to hold the upper surface 51a of the component body 51, that is, the upper surface of the lens component 50, on the suction head 81. When the lens component 50 is held by the suction head 81, the solder balls 65 partially project from the lower openings of the solder ball receptacles 55 toward the lower side of the component body 51. In this state, the solder balls 65 are separated from lower ends 84b of the heating probes 84.

Figure 9B:
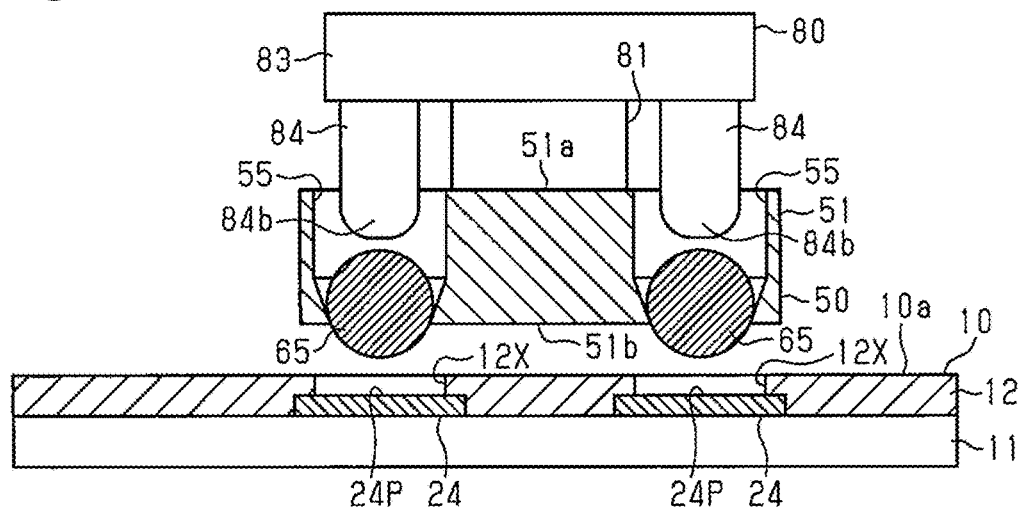
Figure 9C:
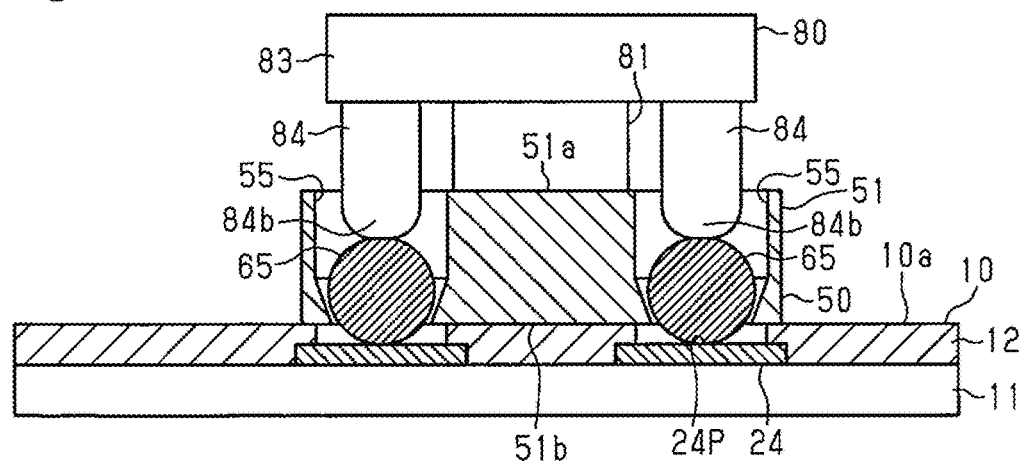

As illustrated in FIG. 9B, the lens component 50 is positioned in alignment with the optical waveguide 12. The solder balls 65, projecting from the lower surface 51b of the component body 51 held by the suction head 81, are positioned directly above the connection pads 24P of the optical-electrical hybrid substrate 10. In FIGS. 9B and 9C, the wiring substrate 11 and the optical waveguide 12 are each simplified and illustrated as a single layer.

As illustrated in FIG. 9C, the suction head 81 is lowered so that the lens component 50 comes into contact with an upper surface 10a of the optical-electrical hybrid substrate 10 (upper surface of optical waveguide 12, in the present example, upper surface of clad layer 33). At this time, the solder balls 65 contact the connection pads 24P of the optical-electrical hybrid substrate 10 (wiring substrate 11), and the solder balls 65 are pushed upward inside the solder ball receptacles 55. When pushed upward, the solder balls 65 are in contact with the lower ends 84b of the heating probes 84 and heated and melted by the heating probes 84. At this time, the temperature of the heating base 83 is, for example, 300° C., and the temperature of the heating probes 84 is, for example, 260° C. or higher. The molten solder partially flows into the openings 12X of the optical waveguide 12 and hardens to serve as the solder portions 62 (refer to FIG. 3). The remaining of the molten solder stays in the solder ball receptacles 55 of the component body 51 and hardens to serve as the solder portions 61 (refer to FIG. 3). As a result, the lens component 50 is fixed to the upper surface 10a of the optical-electrical hybrid substrate 10 by the solder portions 61 and 62.

The operation of the optical waveguide device 1 will now be described.

First, comparative examples will be described.

Figure 10A:
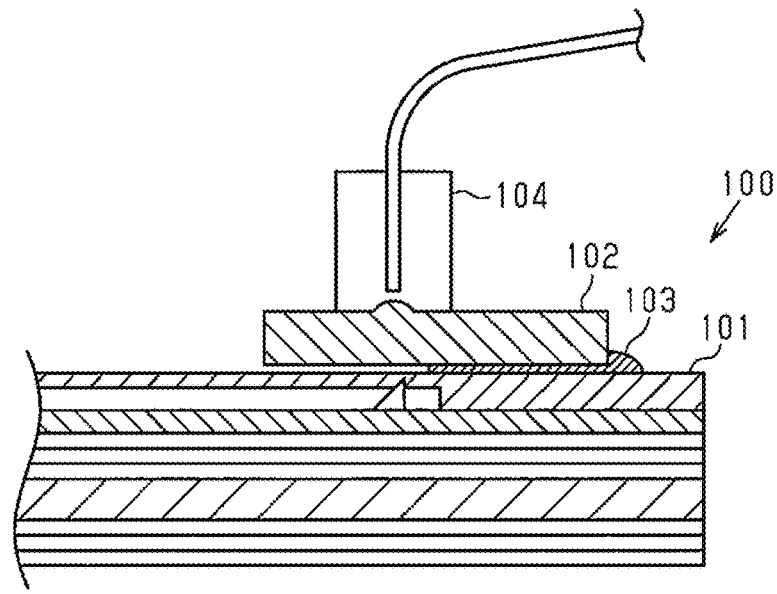
FIGS. 10A and 10B are schematic cross-sectional views illustrating comparative examples of an optical waveguide device.
Figure 10B:
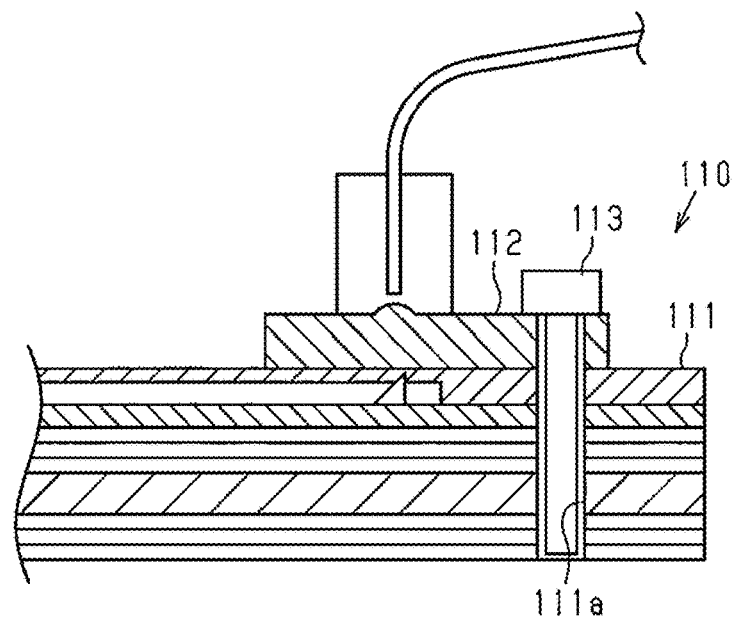

FIG. 10A illustrates a portion of a comparative example of an optical waveguide device 100. FIG. 10B illustrates a portion of another comparative example of an optical waveguide device 110.

In the optical waveguide device 100 illustrated in FIG. 10A, a lens component 102 is fixed to the upper surface of an optical-electrical hybrid substrate 101 by an adhesive 103. In this case, when an optical fiber connector 104 is attached to or removed from the lens component 102, a strong stress is generated in the portion fixing the lens component 102 to the optical-electrical hybrid substrate 101. In this regard, the lens component 102 may be increased in size to increase the adhesion area of the adhesive 103 and the adhesion strength. However, in this process, an increase in the size of the lens component 102 results in an increase in the size of the optical-electrical hybrid substrate 101 (area where the lens component 102 is mounted).

In the optical waveguide device 110 illustrated in FIG. 10B, a lens component 112 is fixed to the upper surface of an optical-electrical hybrid substrate 111 by a screw 113 engaged with the optical-electrical hybrid substrate 111. In this case, the optical-electrical hybrid substrate 111 needs to include a hole 111a to allow for insertion of the screw 113. Additionally, projection of the distal end of the screw 113 from the lower surface of the optical-electrical hybrid substrate 111 needs to be avoided. This imposes limitations on the design and quality of the optical-electrical hybrid substrate 111.

In this regard, in the optical waveguide device 1 of the present embodiment, the lens component 50 is connected to the connection pads 24P of the optical-electrical hybrid substrate 10 by the solder portions 61 and 62. The lens component 50 has a high connection strength to the optical-electrical hybrid substrate 10. Thus, the fixing strength of the lens component 50 is increased.

The present embodiment has the advantages described below.

(1) The optical waveguide device 1 includes the optical-electrical hybrid substrate 10 and the lens component 50 mounted on the optical-electrical hybrid substrate 10. The optical-electrical hybrid substrate 10 includes the wiring substrate 11 and the optical waveguide 12 arranged on the wiring substrate 11. The optical waveguide 12 includes the openings 12X partially exposing the wiring layer 24 of the wiring substrate 11 as the connection pads 24P. The lens component 50 includes the component body 51 and the solder balls 65. The component body 51 includes the lens portions 52 and the solder ball receptacles 55 accommodating the solder balls 65. When the lens component 50 is mounted on the optical-electrical hybrid substrate 10, the solder balls 65 melt and harden to form the solder portions 61 in the solder ball receptacles 55 and the solder portions 62 in the openings 12X of the optical waveguide 12. As a result, the lens component 50 is connected to the connection pads 24P by the solder portions 61 located in the solder ball receptacles 55 and the solder portions 62 located in the openings 12X of the optical waveguide 12. This allows the lens component 50 to be mounted on the optical-electrical hybrid substrate 10 without using an additional connecting member (e.g., adhesive or screw). Additionally, since the lens component 50 is connected to the optical-electrical hybrid substrate 10 by the solder portions 61 and 62, the fixing strength of the lens component 50 is increased. Further, the solder portions 62 flow into the openings 12X of the optical waveguide 12 and harden. This limits flow of the solder portions 62 between the lens component 50 and the optical waveguide 12.

(2) The solder balls 65 adhere to the wall surfaces of the solder ball receptacles 55 with flux jelly. This limits separation of the solder balls 65 from the solder ball receptacles 55. Additionally, with use of flux jelly, when the solder balls 65 are melted, the flux is applied to the connection pads 24P of the wiring substrate 11. Thus, soldering is favorably performed.

(3) The mounting jig 80 includes the heating probes 84 insertable into the solder ball receptacles 55. The heating probes 84 contact and melt the solder balls 65 located in the solder ball receptacles 55. This limits increases in the temperature of, for example, the lens portions 52 of the lens component 50 during soldering. Thus, the lens component 50 is mounted in a preferable manner.

It should be apparent to those skilled in the art that the foregoing embodiments may be implemented in many other specific forms without departing from the scope of this disclosure. Particularly, it should be understood that the foregoing embodiments may be implemented in the following forms.

In the above embodiment, instead of the solder balls 65, a conductive paste obtained by dispersing particles of metal such as Ag into a resin may be spherically shaped and used.

In the above embodiment, the shape of the solder ball receptacles 55 may be modified. For example, it is only necessary to set the dimension (diameter) of the lower openings of the solder ball receptacles 55 in the lower surface 51b of the component body 51 to be smaller than the dimension (diameter) of the solder balls 65, and the solder ball receptacles 55 may be formed so that the inner diameter (diameter) is gradually decreased from the upper openings (upper surface 51a) to the lower openings (lower surface 51b) of the solder ball receptacles 55. That is, the solder ball receptacles 55 may be entirely formed as tapered holes.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to an illustration of the superiority and inferiority of the invention. Although embodiments have been described in detail, it should be understood that various changes, substitutions, and alterations could be made hereto without departing from the scope of this disclosure.

The invention claimed is:

1. An optical waveguide device, comprising:
   an optical-electrical hybrid substrate including
      a wiring substrate, and
      an optical waveguide arranged on the wiring substrate;
   an optical path changer arranged on an end of the optical waveguide; and
   a lens component mounted on the optical-electrical hybrid substrate, wherein
   the optical waveguide includes an opening configured to expose a connection pad of the wiring substrate, and
   the lens component includes
      a component body including a conductive ball receptacle at a position corresponding to the opening of the optical waveguide,
         wherein the component body includes a mounting surface mounted on an upper surface of the optical-electrical hybrid substrate, and
         wherein the conductive ball receptacle includes an enlarged diameter portion having a diameter that gradually increases from a lower opening formed in the mounting surface of the component body, and
      a conductive member adhered to a wall surface of the enlarged diameter portion of the conductive ball receptacle and to an upper surface of the connection pad.

2. The optical waveguide device according to claim 1, wherein
   the conductive ball receptacle is a solder ball receptacle configured to accommodate a solder ball, and
   the conductive member is solder formed from the solder ball.

3. The optical waveguide device according to claim 1, wherein the component body includes an attachment hole that allows for attachment of an optical fiber connector.

4. The optical waveguide device according to claim 1, wherein
   the optical path changer is one of optical path changers arranged at opposite ends of the optical waveguide, and
   the optical waveguide device further comprises an optical element mounted on the optical-electrical hybrid substrate and optically connected to the optical path changer arranged at one of the opposite ends of the optical waveguide.

5. A lens component comprising:
   a component body configured to be mounted on an optical-electrical hybrid substrate, the component body including
      a lens portion, and
      a conductive ball receptacle extending between an upper surface of the component body and a lower surface of the component body,
      wherein the lower surface of the component body is a mounting surface mounted on an upper surface of the optical-electrical hybrid substrate, and
      wherein the conductive ball receptacle includes an enlarged diameter portion having a diameter that gradually increases from a lower opening formed in the mounting surface of the component body, and
   a conductive ball accommodated in the enlarged diameter portion of the ball receptacle and adhered to a wall surface of the enlarged diameter portion, wherein the conductive ball accommodated in the enlarged diameter portion partially projects from the mounting surface of the component body.

* * * * *